(12) United States Patent
Wise (10) Patent No.: US 12,223,859 B2
(45) Date of Patent: Feb. 11, 2025

(54) SUSPENDED SYSTEM WITH ORIENTATION CONTROL

(71) Applicant: Andrew Wise, Glendale, AZ (US)

(72) Inventor: Andrew Wise, Glendale, AZ (US)

(73) Assignee: Drone Aerial Services, LLC, Glendale, AZ (US)

( * ) Notice: Subject to any disclaimer, the term of this patent is extended or adjusted under 35 U.S.C. 154(b) by 0 days.

(21) Appl. No.: 18/342,711

(22) Filed: Jun. 27, 2023

(65) Prior Publication Data
US 2023/0343253 A1    Oct. 26, 2023

Related U.S. Application Data

(63) Continuation of application No. 17/673,498, filed on Feb. 16, 2022, now Pat. No. 11,688,312.

(Continued)

(51) Int. Cl.
*G09F 21/12* (2006.01)
*F04D 19/00* (2006.01)
(Continued)

(52) U.S. Cl.
CPC ........... *G09F 21/12* (2013.01); *F04D 19/002* (2013.01); *F04D 27/00* (2013.01); *G05D 1/0094* (2013.01);
(Continued)

(58) Field of Classification Search
CPC ...... G09F 21/12; G09F 13/30; G09F 15/0012; G09F 19/12; B64C 39/024;
(Continued)

(56) References Cited

U.S. PATENT DOCUMENTS 3,849,921 A   11/1974 Nelson
3,969,494 A   7/1976 Nobuoka
(Continued)

FOREIGN PATENT DOCUMENTS

BR   202014026960 U2   5/2017
DE         2356504 A   5/1975
(Continued)

OTHER PUBLICATIONS

Notice of Allowance dated Feb. 17, 2023 for U.S. Appl. No. 17/673,498 (pp. 1-9).
(Continued)

*Primary Examiner* — Cassandra Davis
(74) *Attorney, Agent, or Firm* — Booth Udall Fuller, PLC; Pacer K. Udall (57) ABSTRACT

Disclosed is a suspended system with orientation control including a planar frame, a plurality of sensors coupled to the frame and configured to track an orientation of the frame in real time and at least two thrusters coupled to the frame and configured to adjust the orientation of the frame. Each of the at least two thrusters may have an axis oriented in a direction perpendicular to the frame and two propellers axially aligned with the axis and configured to rotate in a same direction while creating thrust in opposite directions. A holographic fan configured to display a graphic may be coupled to the frame. The planar frame may be suspended from an unmanned aerial vehicle.

19 Claims, 9 Drawing Sheets

Related U.S. Application Data (60) Provisional application No. 63/238,690, filed on Aug. 30, 2021.

(51) Int. Cl.
  *F04D 27/00* (2006.01)
  *G05D 1/00* (2006.01)
  *G09F 13/30* (2006.01)
  *G09F 15/00* (2006.01)
  *G09F 19/12* (2006.01)
  *B64U 101/00* (2023.01)
  *B64U 101/24* (2023.01)

(52) U.S. Cl.
  CPC .......... *G09F 13/30* (2013.01); *G09F 15/0012* (2013.01); *G09F 19/12* (2013.01); *B64U 2101/00* (2023.01); *B64U 2101/24* (2023.01)

(58) Field of Classification Search
  CPC ... B64C 2201/12; F04D 19/002; F04D 27/00; G05D 1/0094; B66C 13/04; B66C 13/05; B66C 13/06; B66C 13/08
  See application file for complete search history.

(56) References Cited

U.S. PATENT DOCUMENTS

| | | | |
|---|---|---|---|
| 5,816,098 | A | 10/1998 | Kanki |
| 8,532,846 | B2 | 9/2013 | Tollenaere |
| 8,938,325 | B1 | 1/2015 | McGinnis |
| 10,538,417 | B1 | 1/2020 | Raman |
| 10,745,126 | B2 * | 8/2020 | Molnar .................. H04N 23/63 |
| 10,870,558 | B2 | 12/2020 | Sikora |
| 11,142,433 | B2 * | 10/2021 | Sikora .................... B66C 13/08 |
| 2004/0134152 | A1 | 7/2004 | Powell |
| 2012/0212712 | A1 | 8/2012 | Scanlon |
| 2016/0351089 | A1 | 12/2016 | Salem |
| 2017/0190421 | A1 | 7/2017 | Diez-Garias |
| 2017/0337581 | A1 | 11/2017 | Nozawa |
| 2018/0047319 | A1 | 2/2018 | Barba |
| 2019/0035317 | A1 | 1/2019 | Rohena |
| 2019/0051224 | A1 | 2/2019 | Marshall |
| 2019/0087145 | A1 | 3/2019 | Park |
| 2019/0241267 | A1 * | 8/2019 | Sikora .................... B64D 1/22 |
| 2019/0375615 | A1 | 12/2019 | Markwell |
| 2020/0003357 | A1 | 1/2020 | Su |
| 2020/0087121 | A1 * | 3/2020 | Ohayon .................. B64C 27/82 |
| 2020/0222257 | A1 * | 7/2020 | Sikora .................... A61G 1/00 |
| 2020/0410540 | A1 | 12/2020 | Williams |
| 2021/0341128 | A1 * | 11/2021 | Abron .................... F21S 41/153 |
| 2023/0067627 | A1 | 3/2023 | Wise |

FOREIGN PATENT DOCUMENTS

| | | |
|---|---|---|
| DE | 102010023228 B4 | 7/2012 |
| KR | 20200000717 A | 1/2020 |
| WO | 2011159362 A2 | 12/2011 |
| WO | 2017172932 A1 | 10/2017 |

OTHER PUBLICATIONS

Notice of Allowance dated Mar. 1, 2023 for U.S. Appl. No. 17/673,498 (pp. 1-3).

Office Action (Notice of Allowance and Fees Due (PTOL-85)) dated Mar. 1, 2023 for U.S. Appl. No. 17/673,498 (pp. 1-3).

Office Action dated Oct. 26, 2022 for U.S. Appl. No. 17/673,498 (pp. 1-12).

* cited by examiner

SUSPENDED SYSTEM WITH ORIENTATION CONTROL

CROSS REFERENCE TO RELATED APPLICATIONS

This application is a continuation of U.S. patent application Ser. No. 17/673,498, titled "Suspended System with Orientation Control" to Andrew Wise and filed on Feb. 16, 2022, which claims the benefit of the filing date of U.S. Provisional Patent Application 63/238,690 titled "Suspended Object Orientation Control System" to Andrew Wise and filed on Aug. 30, 2021, the disclosures of which are hereby incorporated herein by this reference.

TECHNICAL FIELD

Aspects of this document relate generally to suspended systems with orientation control, and more specifically to suspended systems with signs or other displays.

BACKGROUND

Objects may be suspended from a support above the object for a variety of reasons. For example, signs are frequently hung from a support without having a fixed position or orientation. Regardless of the reason, these objects frequently are moved from an ideal orientation or position by the wind or by the motion of the support, disrupting the purpose of the object. For example, a sign may become turned around such that the sign is unreadable.

SUMMARY

Aspects of this document relate to a suspended system with orientation control including a planar frame, a plurality of sensors coupled to the frame and configured to track an orientation of the frame in real time, and at least two thrusters coupled to the frame and configured to adjust the orientation of the frame, wherein each of the at least two thrusters has an axis oriented in a direction perpendicular to the frame and two propellers axially aligned with the axis and configured to rotate in a same direction while creating thrust in opposite directions.

Particular embodiments may comprise one or more of the following features.

The frame has a plurality of members and each member of the plurality of members extends within a single plane.

A holographic fan configured to display a graphic may be coupled to the frame.

Each of the at least two thrusters may have an axis oriented in a direction perpendicular to the frame and two propellers axially aligned with the axis and configured to rotate in a same direction while creating thrust in opposite directions.

A microcontroller may be operatively coupled to the plurality of sensors and the at least two thrusters and be configured to: receive a selected orientation of the frame from a user; receive the orientation of the frame from the plurality of sensors; and control the at least two thrusters to adjust the orientation of the frame into the selected orientation.

The frame may include four corners, and wherein a thruster of the at least two thrusters is positioned adjacent each corner of the four corners.

The planar frame may be suspended from an unmanned aerial vehicle.

Each of the at least two thrusters may be a bidirectional thruster and configured to selectably create thrust in two opposite directions.

Other aspects of this document relate to a suspended system with orientation control including a planar frame, a holographic fan coupled to the frame and configured to display a graphic, a plurality of sensors coupled to the frame and configured to track an orientation of the frame, and at least two thrusters coupled to the frame and configured to adjust the orientation of the frame.

Particular embodiments may comprise one or more of the following features.

The frame has a plurality of members and each member of the plurality of members extends within a single plane.

Each of the at least two thrusters may have an axis oriented in a direction perpendicular to the frame and two propellers axially aligned with the axis and configured to rotate in a same direction while creating thrust in opposite directions.

A microcontroller may be operatively coupled to the plurality of sensors and the at least two thrusters and be configured to: receive a selected orientation of the frame from a user; receive the orientation of the frame from the plurality of sensors; and control the at least two thrusters to adjust the orientation of the frame into the selected orientation.

The frame may include four corners, and wherein a thruster of the at least two thrusters is positioned adjacent each corner of the four corners.

The planar frame may be suspended from an unmanned aerial vehicle.

Each of the at least two thrusters may be a bidirectional thruster and configured to selectably create thrust in two opposite directions.

Still other aspects of this document relate to a suspended system with orientation control including an unmanned aerial vehicle, a planar frame suspended from the unmanned aerial vehicle, a plurality of sensors coupled to the frame and configured to track an orientation of the frame, and at least two thrusters coupled to the frame and configured to adjust the orientation of the frame.

Particular embodiments may comprise one or more of the following features.

The frame has a plurality of members and each member of the plurality of members extends within a single plane.

Each of the at least two thrusters may have an axis oriented in a direction perpendicular to the frame and two propellers axially aligned with the axis and configured to rotate in a same direction while creating thrust in opposite directions.

A microcontroller may be operatively coupled to the plurality of sensors and the at least two thrusters and be configured to: receive a selected orientation of the frame from a user; receive the orientation of the frame from the plurality of sensors; and control the at least two thrusters to adjust the orientation of the frame into the selected orientation.

The frame may include four corners, and wherein a thruster of the at least two thrusters is positioned adjacent each corner of the four corners.

Each of the at least two thrusters may be a bidirectional thruster and configured to selectably create thrust in two opposite directions.

A holographic fan configured to display a graphic may be coupled to the frame.

The foregoing and other aspects, features, applications, and advantages will be apparent to those of ordinary skill in the art from the specification, drawings, and the claims. Unless specifically noted, it is intended that the words and phrases in the specification and the claims be given their plain, ordinary, and accustomed meaning to those of ordinary skill in the applicable arts. The inventor is fully aware that he can be his own lexicographer if desired. The inventor expressly elects, as his own lexicographer, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventor's intent and desire that the simple, plain and ordinary meaning to the terms be applied to the interpretation of the specification and claims.

The inventor is also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventor is fully informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112(f). Moreover, even if the provisions of 35 U.S.C. § 112(f) are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those of ordinary skill in the art from the specification, drawings, and the claims.

BRIEF DESCRIPTION OF THE DRAWINGS

Implementations will hereinafter be described in conjunction with the appended drawings, where like designations denote like elements, and.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations.

DETAILED DESCRIPTION

This disclosure, its aspects and implementations, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

While this disclosure includes a number of implementations that are described in many different forms, there is shown in the drawings and will herein be described in detail particular implementations with the understanding that the present disclosure is to be considered as an exemplification of the principles of the disclosed methods and systems, and is not intended to limit the broad aspect of the disclosed concepts to the implementations illustrated.

In the following description, reference is made to the accompanying drawings which form a part hereof, and which show by way of illustration possible implementations. It is to be understood that other implementations may be utilized, and structural, as well as procedural, changes may be made without departing from the scope of this document. As a matter of convenience, various components will be described using exemplary materials, sizes, shapes, dimensions, and the like. However, this document is not limited to the stated examples and other configurations are possible and within the teachings of the present disclosure. As will become apparent, changes may be made in the function and/or arrangement of any of the elements described in the disclosed exemplary implementations without departing from the spirit and scope of this disclosure.

Figure 1:
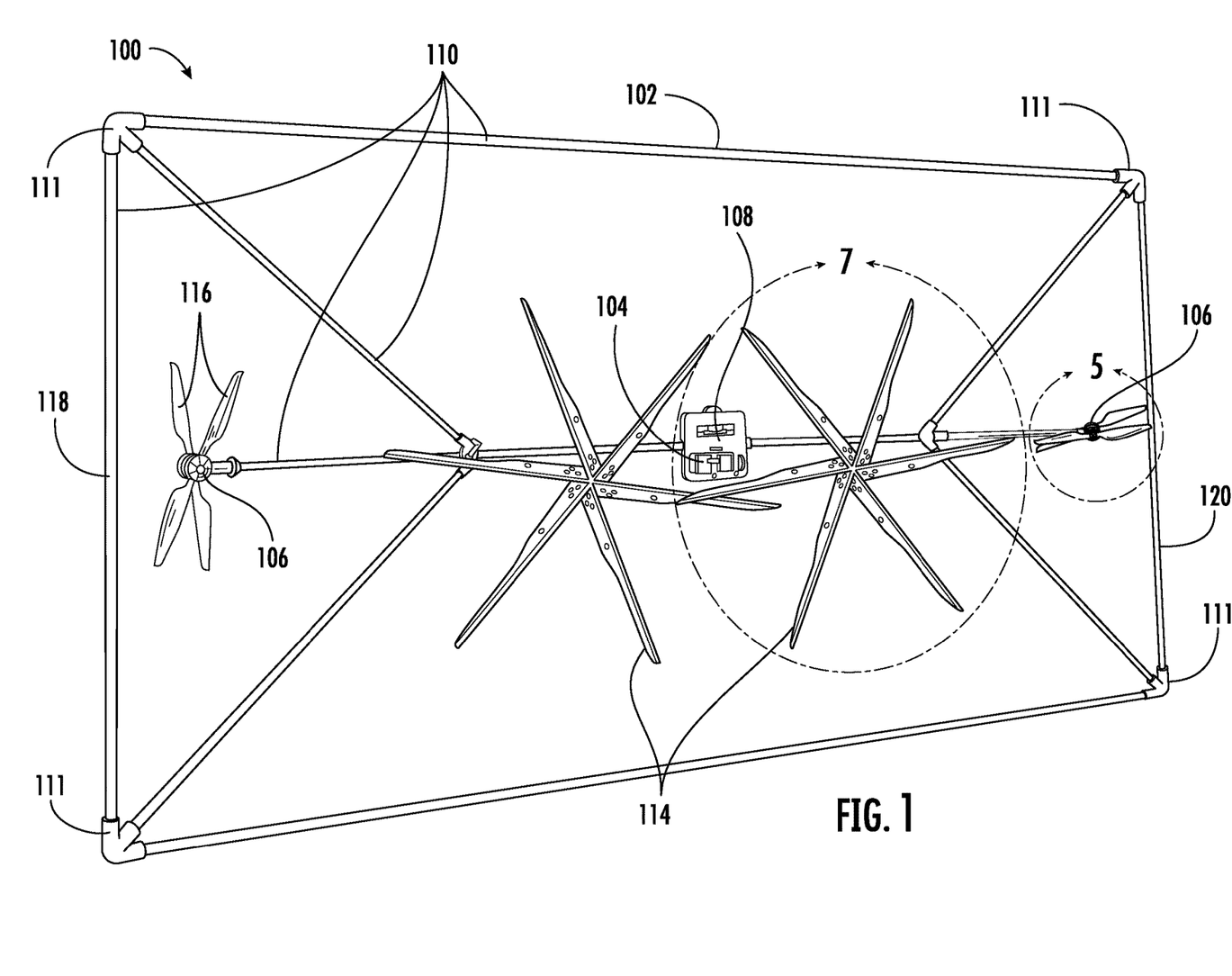
FIG. 1 is a perspective view of a suspended system with orientation control and a holographic fan.
Figure 2:
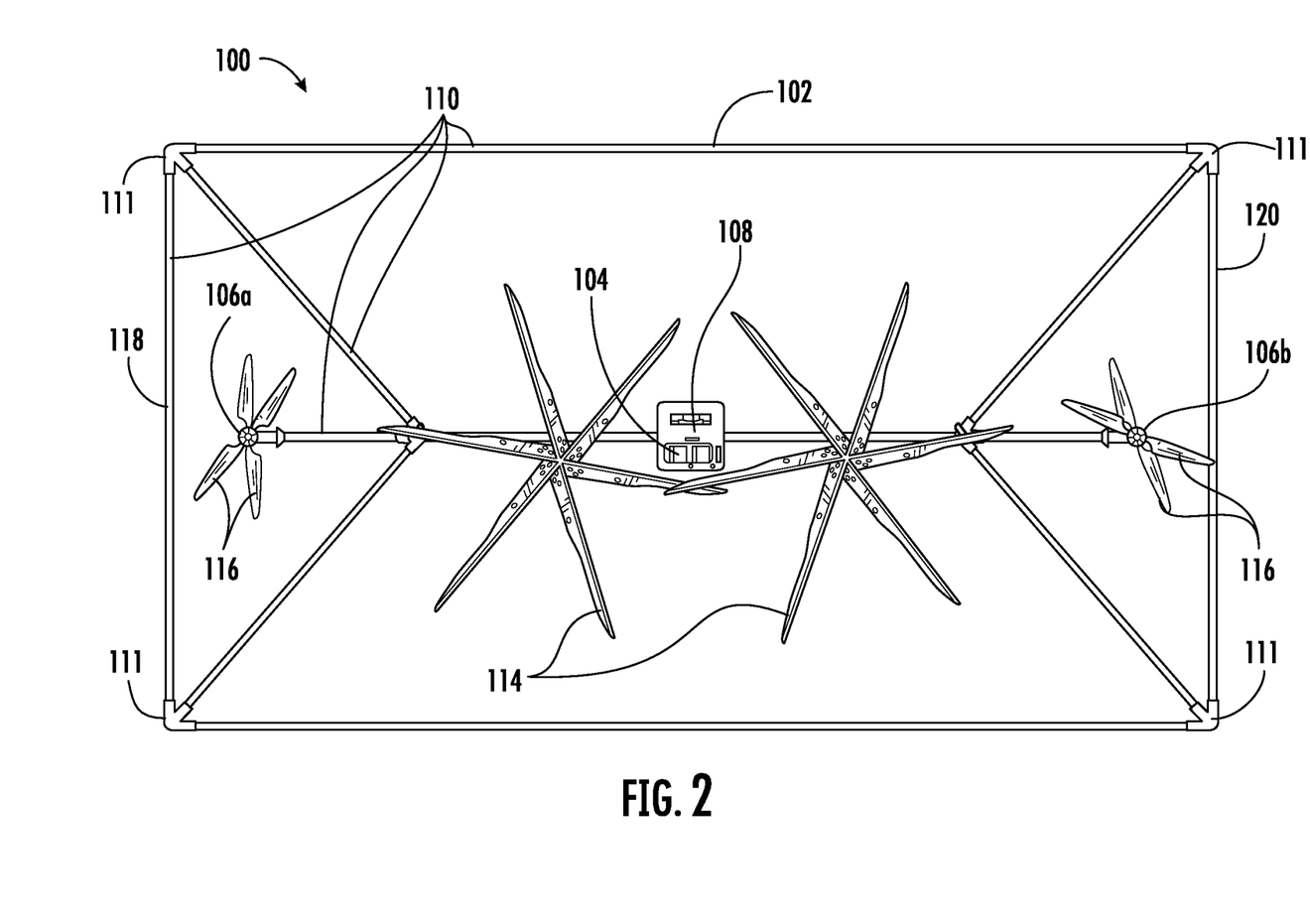
FIG. 2 is a front view of the suspended system shown in FIG. 1.
Figure 3:
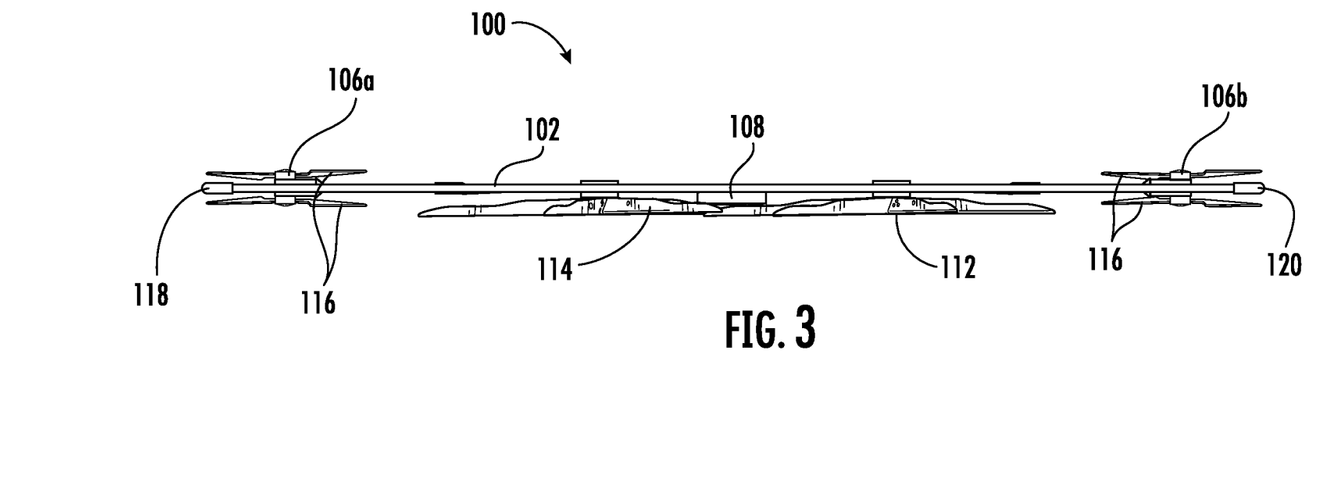
FIG. 3 is a top view of the suspended system shown in FIG. 1.
Figure 4:
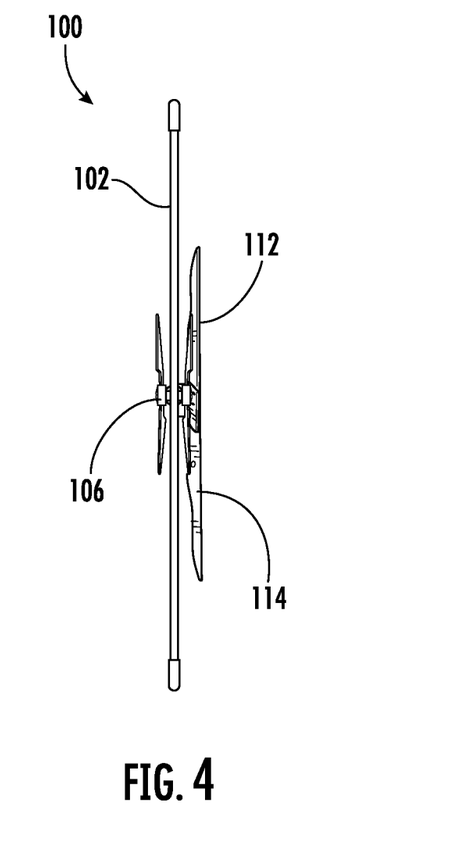
FIG. 4 is a side view of the suspended system shown in FIG. 1.

The present disclosure is related to a suspended system 100 with orientation control. The suspended system 100 is configured to receive a selected position and orientation from the user, move to the selected position and orientation, and maintain that position and orientation over time, adapting to changing conditions such as motion of the suspended system 100 and wind. As shown in FIG. 1, the suspended system 100 has a frame 102, a plurality of sensors 104, at least two thrusters 106, and a microcontroller 108. The suspended system 100 may also include a remote control or mobile app which allows the user to control the suspended system 100 remotely. Thus, the user may be enabled to change the selected position and/or orientation wirelessly, without requiring physical access to the suspended system 100.

The frame 102 is configured to be suspended from a support 10. Thus, the frame 102 may be free to rotate about a vertical axis. The support 10 may be a fixed object, such as a protrusion from a building or a pole, or may be a mobile support, such as an unmanned aerial vehicle (see FIG. 9) or a blimp. The support 10 could also be a cable or other dynamic support which allows the suspended system 100 to move along the support 10.

The frame 102 may have a plurality of members 110. In some embodiments, each member 110 the plurality of members 110 extends within a single plane, as shown in FIGS. 1-4. In other words, the frame 102 may be planar, with each member 110 of the frame 102 contained within one plane. The frame 102 shown in FIG. 1 is rectangular, and thus has four corners 111. However, the frame 102 may be any shape. In some embodiments, the frame 102 has a front face 112. The front face 112 may not be solid, but instead may be an imaginary surface extending across the frame 102, defined by physical components of the frame 102 such as the members 110 of the frame 102. The front face 112 may be planar.

Figure 7:
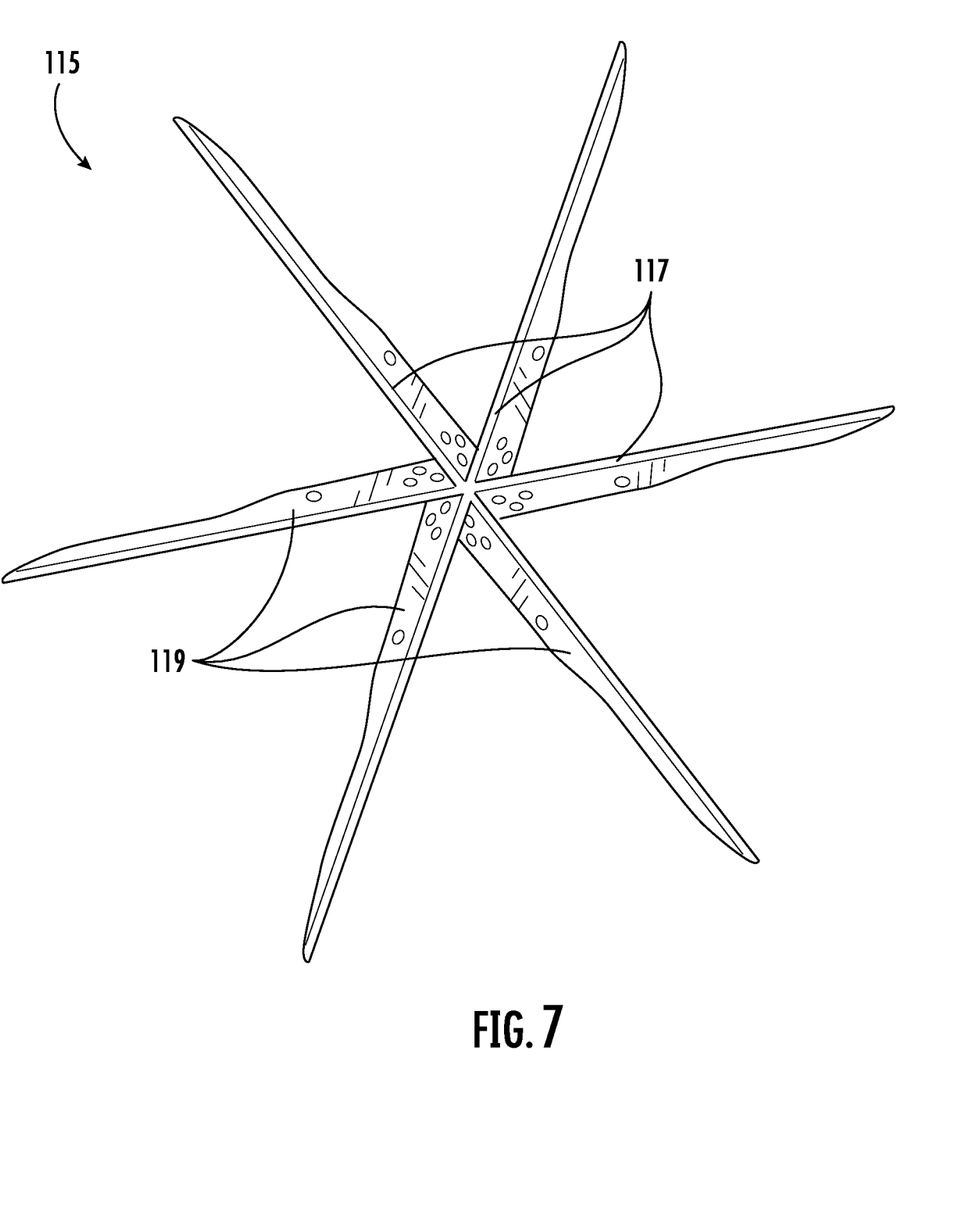
FIG. 7 is a close-up perspective view of the holographic fan shown in FIG. 1, taken from circle 7.
Figure 8:
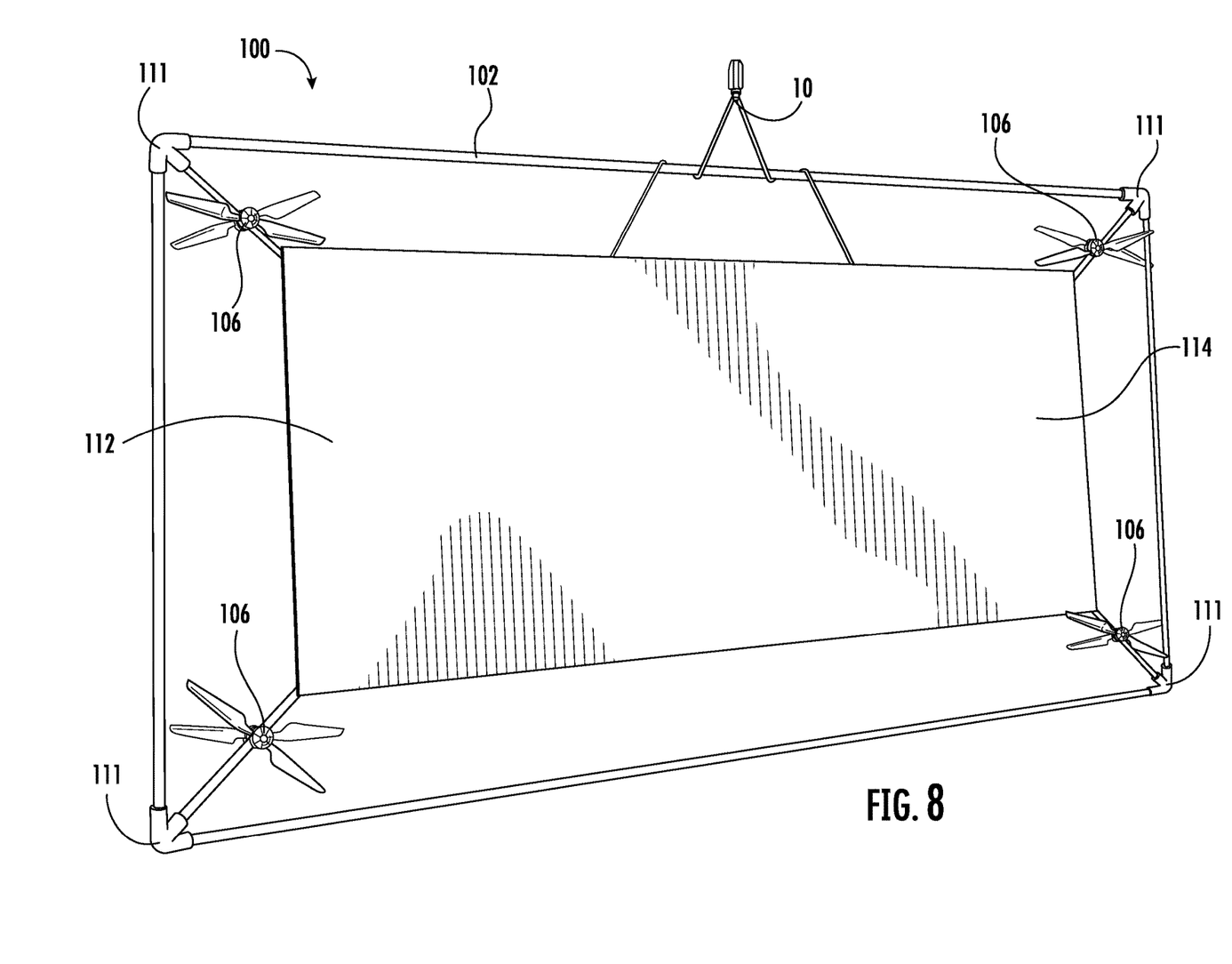
FIG. 8 is a perspective view of the suspended system shown in FIG. 1, but with thrusters positioned adjacent each of the four corners of the frame and a physical sign replacing the holographic fan.

The suspended system 100 may also comprise a sign 114 attached to the frame 102 and configured to display a graphic. The sign 114 may comprise a holographic fan 115, as shown in FIG. 1. The holographic fan 115 has a plurality of lights 117 along each of the blades 119 of the fan 115 (see FIG. 7). As the fan 115 turns, the lights 117 are configured to light up at the right moment to produce a holographic-like image. The sign 114 may also comprise a physical sign, as shown in FIG. 8.

In an embodiment having a sign 114 attached to the frame 102, the front face 112 may be defined by a surface of the sign 114 where the graphic is displayed. For example, without regard to the actual shape of the frame 102, the front face 112 of the frame 102 may be the front surface of the blades shown in FIG. 1 that make up the sign 114 because the frame 102 supports the sign 114 in its position, making the front surface of the blades the front face 112 of the frame 102. As another example, the front face 112 of the frame 102 may be the front surface of the sign 114 shown in FIG. 8.

The plurality of sensors 104 are coupled to the frame 102 and are configured to track an orientation of the frame 102. In some embodiments, the plurality of sensors 104 also track a position of the frame 102. The plurality of sensors 104 may be positioned near a center of the frame 102, adjacent the microcontroller 108, as shown in FIG. 1. Alternatively, the sensors 104 may be positioned at various locations on the frame 102 as may be advantageous to the user. For example, in situations where it is helpful to have accurate readings of the motion of the thrusters 106, the plurality of sensors 104 may be positioned with each of the thrusters 106. The plurality of sensors 104 could also be positioned on the corners 111 of the frame 102, or at any other location of the suspended system 100.

The plurality of sensors 104 may track the position and/or the orientation of the frame 102. By tracking the position and/or orientation of the frame 102, the sensors 104 create a feedback loop for the microcontroller 108 so that the suspended system 100 can respond to changing conditions.

In some embodiments, the plurality of sensors 104 tracks the position and/or orientation of the frame 102 in real time. When tracking in real time, the sensors 104 may take measurements at any time interval as required for the system 100 to take action to maintain the desired position and/or desired orientation for the frame 102. The time interval may be regular. In some embodiments, the time interval is at least once every second or at least once every two seconds. Alternatively, the time interval may be variable, allowing the system 100 to take measurements infrequently when conditions are not significantly changing, such as when the system 100 is used indoors, but also allowing the system 100 to adapt to take measurements more frequently when changes begin occurring, such as when the system 100 is used outdoors and the wind begins blowing.

The plurality of sensors 104 may take other measurements to predict changes in the position and/or orientation of the frame 102 before they occur. For example, the plurality of sensors may measure windspeed, wind direction, and temperature to allow the suspended system 100 to counteract the effects of the wind as quickly as possible. The plurality of sensors 104 may measure the acceleration and rotation of the frame 102, including the roll, pitch, and yaw, to counter any undesired changes as quickly as possible.

The plurality of sensors 104 may include any combination of the following: a gyroscope, an accelerometer, a barometer, and a magnetometer. The suspended system 100 may be configured to send all data collected from the plurality of sensors 104 to the remote control or mobile app of the user so that the user is able to monitor the suspended system 100 during use.

The thrusters 106 are attached to the frame 102 and are configured to adjust the orientation of the frame 102. In some embodiments, the thrusters 106 may also be configured to adjust the position of the frame 102. The thrusters 106 may comprise a rotatory propeller 116 that creates thrust by rotating about an axis. For example, the propeller 116 may have blades that are shaped to create thrust when rotated about the axis, as is known in the art. The axis of each thruster 106 may be oriented in a direction perpendicular to the front face 112. The axis of each thruster 106 may be parallel with the axes of the other thrusters 106. For embodiments with a planar frame 102 as disclosed above, the axis of each thruster 106 may be oriented in a direction perpendicular to the plane of the frame 102.

The thrusters 106 may be positioned in various locations on the frame 102. For example, a first thruster 106a of the at least two thrusters 106 may be positioned on a first end 118 of the frame 102, while a second thruster 106b of the at least two thrusters 106 may be positioned on a second end 120 of the frame 102, where the second end 120 is opposite the first end 118. As another example, a thruster 106 may be positioned adjacent each corner 111 of the frame 102. Thus, for an embodiment of the suspended system 100 with four corners 111 as shown in FIG. 8, a thruster 106 may be positioned each of the four corners 111.

Figure 5:
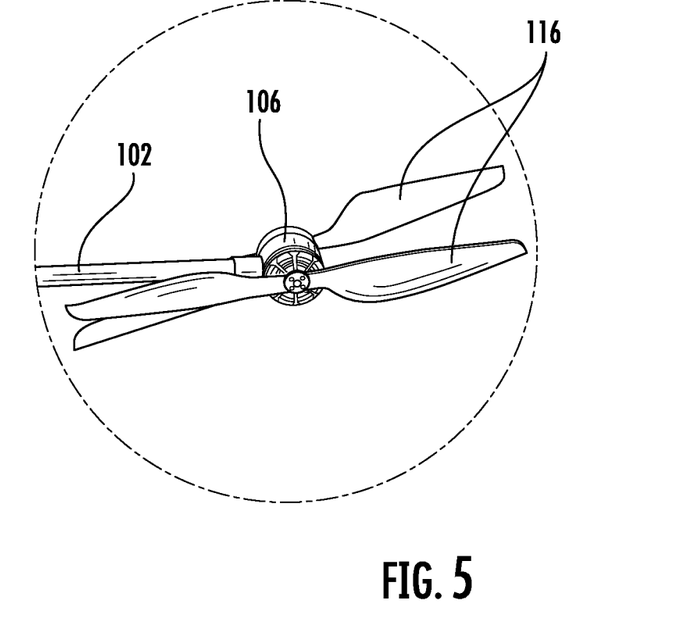
FIG. 5 is a close-up perspective view of a thruster of the suspended system shown in FIG. 1, taken from circle 5.

As mentioned above, each of the thrusters 106 may comprise a propeller 116. In some embodiments, the thrusters 106 may comprise two propellers 116, as shown in FIG. 5. In such an embodiment, the propellers 116 may be axially aligned to provide opposing forces at the same point. This increases the control with which the suspended system 100 can be rotated. The propellers 116 may be configured to rotate in the same direction while creating thrust in opposite directions. This helps to avoid creating problems with the pitch of the frame 102. If the propellers 116 rotate in opposite directions, they both contribute to the frame 102 tilting towards one side. By having them rotate in the same direction, the propellers 116 instead cancel this effect out.

Figure 6:
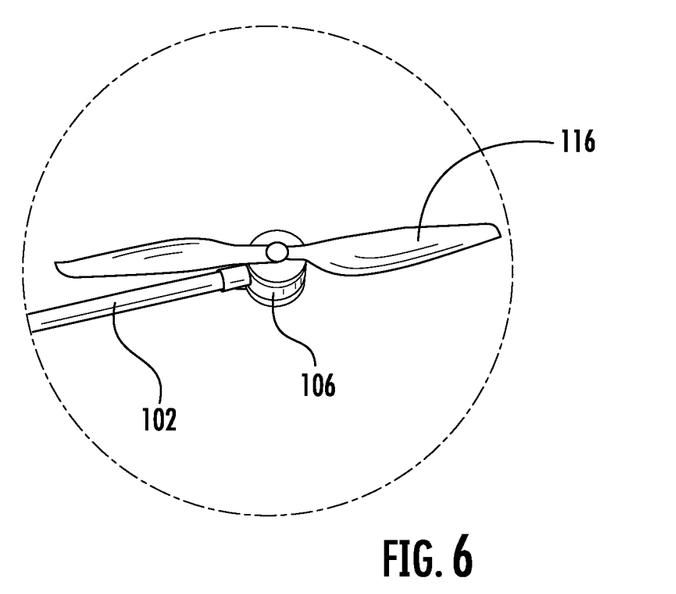
FIG. 6 is a close-up perspective view of another embodiment of the thruster of the suspended system.

In some embodiments, the thruster 106 comprises a single propeller, as shown in FIG. 6. In such an embodiment, the thruster 106 may be bidirectional, and thus may be configured to selectably create thrust in two opposite directions. The bidirectional thruster 106 may be used to create thrust in either direction depending on which direction is needed to move the frame 102 into the desired orientation or maintain the frame 102 in the desired orientation.

The microcontroller 108 is operatively coupled to the plurality of sensors 104 and to the at least two thrusters 106. The microcontroller 108 is configured to receive data from the plurality of sensors 104 and use this data to control the thrusters 106 for a desired outcome. For example, the user may desire for the sign 114 to face a single direction without rotating. The plurality of sensors 104 may send measurements regarding the physical motion of the frame 102, such as the acceleration, rotation, and position, as well as environmental factors that affect the frame 102, such as the wind speed. The microcontroller 108 is configured to take these measurements and control the thrusters 106 to counteract any motion that has been measured. As another example, the user may desire for the sign 114 to rotate to face a new direction. The microcontroller 108 is configured to control the thruster 106 to carry out this change, and is configured to monitor the motion as it occurs to ensure that the frame 102 reaches the desired position and/or orientation.

Figure 9:
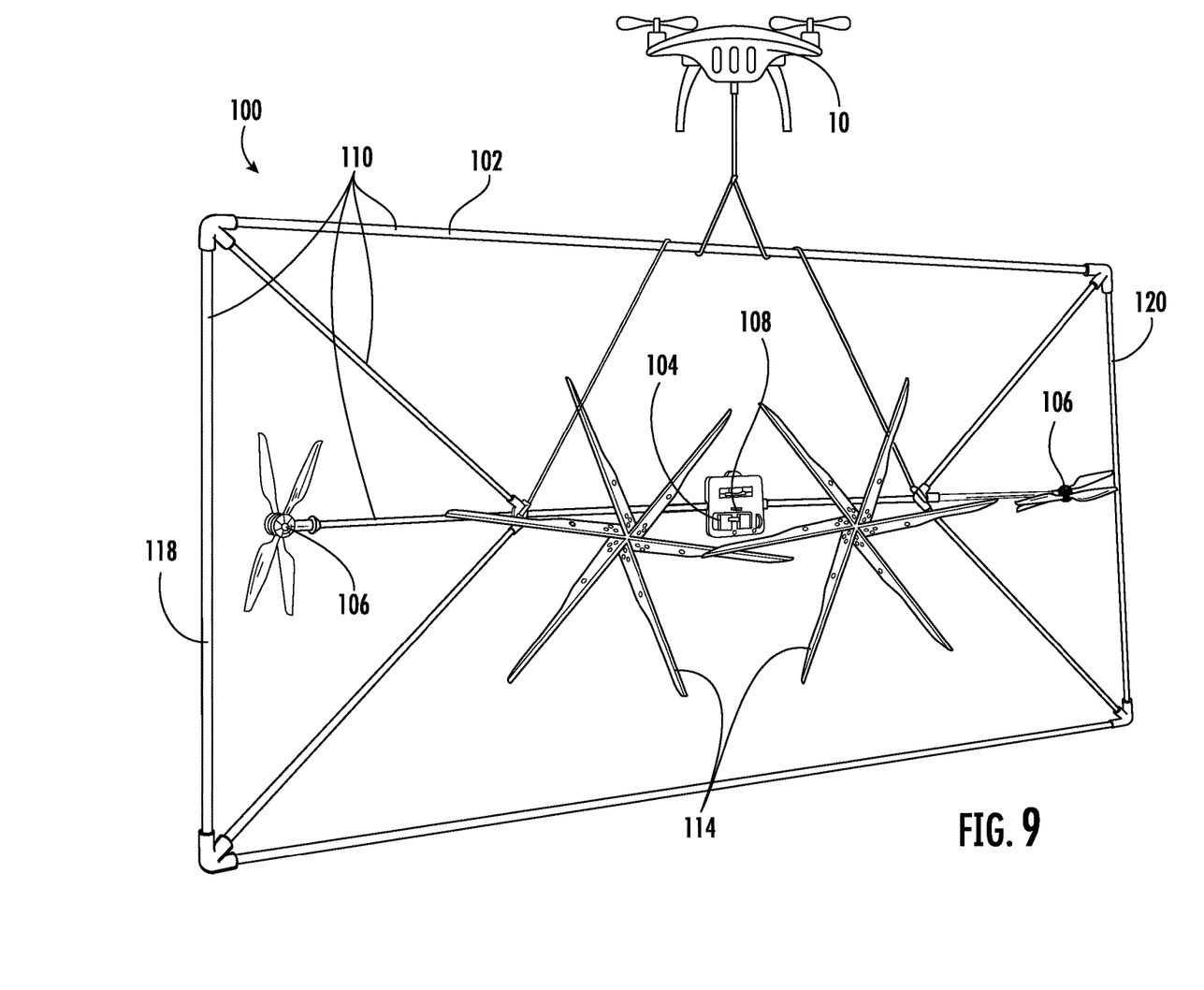
FIG. 9 is a schematic showing the suspended system shown in FIG. 1 in use, suspended from an unmanned aerial vehicle.

In embodiments which have a holographic fan 115 and are suspended from a support 10 which is mobile, or in embodiments that are configured to move with respect to the support 10, the suspended system 100 may be used to create a graphic display which is larger than the frame 102. For example, an embodiment with a holographic fan 115 that is suspended from an unmanned aerial vehicle, as shown in FIG. 9, can be moved using the unmanned aerial vehicle to position the holographic fan 115 in different locations. Because the holographic fan 115 creates images by turning lights 117 on and off when the lights 117 are in specific locations, moving the suspended system 100 into different positions allows the holographic fan 115 to create images that move over distances larger than any dimension of the frame 102. For example, the suspended system 100 could be used to display a mascot flying above a sports field. Instead of being contained within a static frame, the mascot could be shown flying to any location as long as that location is accessible to the suspended system 100. The orientation control features of the suspended system 100 allow the frame 102 to remain stable even as the suspended system 100 moves to different locations. This effect may be especially remarkable in low-light situations because the frame 102 may not be visible, making the floating and moving holographic image even more impressive to viewers.

Figure 10:
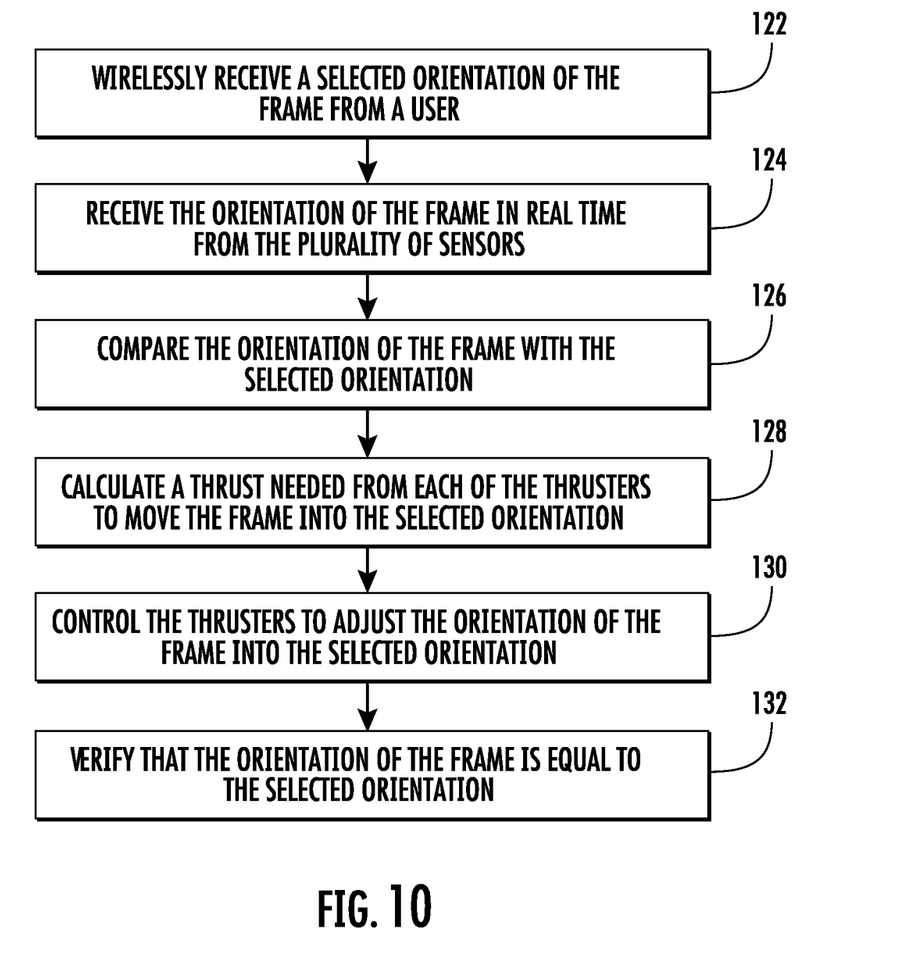
FIG. 10 is a process diagram illustrating various functions which the microcontroller is configured to perform.

FIG. 10 illustrates various functions which the microcontroller may be configured to perform. As shown, the microcontroller may be configured to wirelessly receive a selected position and/or a selected orientation of the frame from a user 122 (e.g., a remote control or mobile app which allows the user to control the suspended system 100 remotely), receive the position and/or the orientation of the frame in real time from the plurality of sensors 124, compare the position of the frame with the selected position and/or the orientation of the frame with the selected orientation 126, calculate a thrust needed from each of the at least two thrusters to move the frame into the selected position and/or the selected orientation 128, control the at least two thrusters to adjust the position and/or the orientation of the frame into the selected position and/or the selected orientation 130, and verify that the position and/or the orientation of the frame are equal to the selected position and/or the selected orientation 132.

It will be understood that implementations of a suspended system with orientation control are not limited to the specific assemblies, devices and components disclosed in this document, as virtually any assemblies, devices and components consistent with the intended operation of a suspended system with orientation control may be used. Accordingly, for example, although particular suspended systems, and other assemblies, devices and components are disclosed, such may include any shape, size, style, type, model, version, class, measurement, concentration, material, weight, quantity, and/or the like consistent with the intended operation of suspended systems. Implementations are not limited to uses of any specific assemblies, devices and components; provided that the assemblies, devices and components selected are consistent with the intended operation of a suspended system with orientation control.

Accordingly, the components defining any suspended system with orientation control may be formed of any of many different types of materials or combinations thereof that can readily be formed into shaped objects provided that the materials selected are consistent with the intended operation of a suspended system with orientation control. For example, the components may be formed of: polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; glasses (such as quartz glass), carbon-fiber, aramid-fiber, any combination thereof, and/or other like materials; composites and/or other like materials; metals, such as zinc, magnesium, titanium, copper, lead, iron, steel, carbon steel, alloy steel, tool steel, stainless steel, brass, nickel, tin, antimony, pure aluminum, 1100 aluminum, aluminum alloy, any combination thereof, and/or other like materials; alloys, such as aluminum alloy, titanium alloy, magnesium alloy, copper alloy, any combination thereof, and/or other like materials; any other suitable material; and/or any combination of the foregoing thereof. In instances where a part, component, feature, or element is governed by a standard, rule, code, or other requirement, the part may be made in accordance with, and to comply under such standard, rule, code, or other requirement.

Various suspended systems may be manufactured using conventional procedures as added to and improved upon through the procedures described here. Some components defining a suspended system with orientation control may be manufactured simultaneously and integrally joined with one another, while other components may be purchased pre-manufactured or manufactured separately and then assembled with the integral components. Various implementations may be manufactured using conventional procedures as added to and improved upon through the procedures described here.

Accordingly, manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g. a bolt, a nut, a screw, a nail, a rivet, a pin, and/or the like), wiring, any combination thereof, and/or the like for example, depending on, among other considerations, the particular material forming the components.

It will be understood that methods for manufacturing or assembling suspended systems are not limited to the specific order of steps as disclosed in this document. Any steps or sequence of steps of the assembly of a suspended system with orientation control indicated herein are given as examples of possible steps or sequence of steps and not as limitations, since various assembly processes and sequences of steps may be used to assemble suspended systems.

The implementations of a suspended system with orientation control described are by way of example or explanation and not by way of limitation. Rather, any description relating to the foregoing is for the exemplary purposes of this disclosure, and implementations may also be used with similar results for a variety of other applications employing a suspended system with orientation control.

The invention claimed is:

1. A suspended system with orientation control, comprising:
   a planar frame;
   a plurality of sensors coupled to the frame and configured to track an orientation of the frame in real time;
   at least two thrusters coupled to the frame and configured to adjust the orientation of the frame, wherein each of the at least two thrusters has an axis oriented in a direction perpendicular to the frame and two propellers axially aligned with the axis and configured to rotate in a same direction while creating thrust in opposite directions; and
   a holographic fan coupled to the frame and configured to display a graphic.

2. The suspended system of claim 1, wherein the frame has a plurality of members and each member of the plurality of members extends within a single plane.

3. The suspended system of claim 1 further comprising a microcontroller operatively coupled to the plurality of sensors and the at least two thrusters, wherein the microcontroller is configured to:
   receive a selected orientation of the frame from a user;
   receive the orientation of the frame from the plurality of sensors; and
   control at least two thrusters to adjust the orientation of the frame into the selected orientation.

4. The suspended system of claim 1, wherein the frame comprises four corners, and wherein a thruster of the at least two thrusters is positioned adjacent each corner of the four corners.

5. The suspended system of claim 1 further comprising an unmanned aerial vehicle, wherein the frame is configured to be suspended from the unmanned aerial vehicle.

6. The suspended system of claim 1, wherein each of the at least two thrusters is a bidirectional thruster and is configured to selectably create thrust in two opposite directions.

7. A suspended system with orientation control, comprising:
   a planar frame;
   a holographic fan coupled to the frame and configured to display a graphic;
   a plurality of sensors coupled to the frame and configured to track an orientation of the frame; and
   at least two thrusters coupled to the frame and configured to adjust the orientation of the frame.

8. The suspended system of claim 7 further comprising a microcontroller operatively coupled to the plurality of sensors and the at least two thrusters, wherein the microcontroller is configured to:
   receive a selected orientation of the frame from a user;
   receive the orientation of the frame from the plurality of sensors; and
   control the at least two thrusters to adjust the orientation of the frame into the selected orientation.

9. The suspended system of claim 7, wherein the frame comprises four corners, and wherein a thruster of the at least two thrusters is positioned adjacent each corner of the four corners.

10. The suspended system of claim 7 further comprising an unmanned aerial vehicle, wherein the frame is configured to be suspended from the unmanned aerial vehicle.

11. The suspended system of claim 7 wherein each of the at least two thrusters has an axis oriented in a direction perpendicular to the frame.

12. The suspended system of claim 7, wherein each of the at least two thrusters is a bidirectional thruster and is configured to selectably create thrust in two opposite directions.

13. The suspended system of claim 7, wherein each of the at least two thrusters comprises two propellers axially aligned and configured to rotate in a same direction while creating thrust in opposite directions.

14. The suspended system of claim 7, wherein the frame has a plurality of members and each member of the plurality of members extends within a single plane.

15. A suspended system with orientation control, comprising:
   an unmanned aerial vehicle;
   a planar frame suspended from the unmanned aerial vehicle;
   a plurality of sensors coupled to the frame and configured to track an orientation of the frame; and
   at least two thrusters coupled to the frame and configured to adjust the orientation of the frame.

16. The suspended system of claim 15 further comprising a holographic fan coupled to the frame and configured to display a graphic.

17. The suspended system of claim 15, wherein each of the at least two thrusters is a bidirectional thruster and is configured to selectably create thrust in two opposite directions.

18. The suspended system of claim 15, wherein the frame comprises four corners and wherein a thruster of the at least two thrusters is positioned adjacent each corner of the four corners.

19. The suspended system of claim 15, wherein the frame has a plurality of members and each member of the plurality of members extends within a single plane.

\* \* \* \* \*